UNITED STATES PATENT OFFICE.

ELBERT E. FISHER, OF TOLEDO, OHIO.

GLASS COMPOSITION AND METHOD OF MAKING SAME.

1,394,296.     Specification of Letters Patent.     Patented Oct. 18, 1921.

No Drawing.     Application filed December 13, 1920. Serial No. 430,416.

*To all whom it may concern:*

Be it known that I, ELBERT E. FISHER, a citizen of the United States, and a resident of Toledo, in the county of Lucas and State of Ohio, have made an invention appertaining to Glass Compositions and Methods of Making Same; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to form a heat resistant glass to be used in the manufacture of glass articles that are to be subjected to repeated high temperature changes. It particularly has for its object to provide a glass that has a uniform expansion throughout the body of the glass and which will be void of local strains or deformations which would otherwise cause fracture of the glass by repeated thermal changes. It also particularly has for its object to provide a composition of glass forming materials that will not only permit of the use of a maximum amount of a stabilizing or strengthening material in the composition, but will also enable the formation of the glass at an exceedingly relatively low temperature.

The invention also has for its object to provide a transparent heat resistant glass that may be formed into articles where heat resisting properties are desirable, such as baking dishes and laboratory receptacles. The invention also has for its object to provide a non-transparent heat resistant glass as well as a transparent heat resistant glass, and, moreover, the invention provides a method whereby the workable temperature of heat resistant glass may be maintained at a relatively low degree. It also provides a process of color formation in silicate or boro silicate glass and for varying and controlling the degree of translucency to opacity.

My invention thus provides a glass composition from which articles may be formed that will have high heat resisting properties, the requisite mechanical strength, and which will not devitrify notwithstanding repeated high thermal changes in the use thereof, and which will be exceedingly tough whereby thick or thin glass articles may be formed that will not develop local strains or deform when subjected to repeated thermal changes, and which may be formed at a relatively low temperature and consequently at a low cost of production. Also my invention provides a glass composition from which articles may be made that will have these properties in varying degrees that may be obtained by varying the compositions or the quantities of ingredients of the glass composition. The invention may thus be embodied in various glass compositions to obtain various degrees of the desired properties and yet such composition will still be within the scope of my invention.

In making up the mixture of glass forming materials I use in addition materials forming the body of the mixture namely, materials containing silica and boric oxid, materials having one or more oxids of metals of the second periodic group and having a low thermal expansion, such as oxids of magnesium, zinc or barium, in the maximum amount possible without however destroying the essential working or developing properties of the glass. I also use materials having oxids of the alkali metals, to produce the fusion of the other ingredients, but in the smallest quantities, in order to maintain a low thermal expansion in the glass when finally formed. To the mixture I also add the materials containing oxids of metals that will prevent crystallization of the silica, such as, alumina, and which also operates to maintain in a large measure the solvent character of the boro silicate formed in the final product.

I use the oxids of the second periodic group, having a low thermal expansion, namely, those having an expansion of 4 and lower as compared with silica, the expansion of silica being taken as a unit and according to the table as given by Hovestadt. These oxids operate to greatly toughen the glass but they also tend to decrease the solubility, and, ordinarily, to raise the fusion point of the mixture. I have however discovered that with a proper mixture of materials containing oxids of sodium, potassium and other oxids of the alkali metals of the first periodic group such as, rubidium and lithium, that there is a coaction, with the oxids of the second periodic group having a low thermal expansion, to further greatly reduce the melting point of the mixture so that the materials of the second periodic group coact to produce a lower fusion point than would be produced by the materials containing the alkali metal oxids alone. I therefore use the said alkali metal oxids of the first periodic group in such proportions that the said oxids of the second periodic group will combine in their action to produce an exceedingly low melting point and permit the use of the maximum amount of the toughening materials, and consequently permit the production of an exceedingly tough glass, both mechanically and thermally. The amount of the alkali metal oxids of the first periodic group must of necessity be small in amount because they increase the thermal expansion, notwithstanding the fact that increased amounts of these oxids decrease the fusion point of the composition. Moreover, when these oxids are incorporated in a glass product in more than a certain amount they decompose from the compounds formed in the final product when subjected to repeated thermal changes producing devitrification and discoloration causing the glass, particularly thin glass, to become fragile.

When boro silicate glass is formed, materials containing 4% to 14% of the oxids of sodium and potassium are, ordinarily, used which permits the melting of the glass composition at 2800° to 2400° Fahr. but with the destructive decomposition that accompanies the use of the oxids of the said alkali metals, particularly if used in amounts in excess of 7 per cent, and also the increased thermal expansion of the glass in the final product which also results from the use of these oxids. When however the oxids of the metals of the second periodic group are used for toughening purposes the fusion point of the glass ordinarily is greatly increased. By using materials having oxids of sodium, potassium, rubidium and lithium the oxids of the two groups coact to greatly reduce the fusion point of the glass.

By using the said oxids of the first periodic group with the oxids of the second periodic group having a low thermal expansion the advantage of the toughening materials is obtained in the glass and yet the fusion is maintained low which reduces decomposition and moreover renders the process of the formation of the glass much easier and more economical. By the use of these oxids the fusion point is reduced to 2400° Fahr.

This mixture will produce, at a relatively low temperature maintained during a sufficient time to permit the proper reactions to take place, a transparent glass having a low thermal coefficient of expansion and one which is exceedingly tough and durable and not subject to internal strains or devitrification on being subjected to repeated thermal changes at temperatures at which baking utensils are subjected. I also thus produce at a low cost an exceedingly valuable transparent glass which may be utilized for culinary and laboratory purposes.

In the formation of the mixture for producing glass that will withstand the repeated temperature changes to which utensils are subjected. I use materials containing silica so as to incorporate in the mixture 60% to 90% of silica and materials containing boric oxid to include in the mixture, 3% to 15% of boric oxid and materials containing one or more of the oxids of the second periodic group having low thermal expansion in amounts such that the total amount of one or more of the oxids will be from 3% to 15%. Also I use materials that will produce preferably three or more oxids of the alkali metals of the first periodic group, such as sodium, potassium, lithium and rubidium in amounts such that the amount of the oxids will be from 2% to 6%, using amounts such that the sodium oxid will be 1% to 6%, potassium oxid will be from .05% to 6%, lithium oxid will be from .05% to 6%, and rubidium oxid will be from .05% to 6%. The alumina which is used to prevent crystallization increases the thermal expansion of the final product and therefore is preferably confined to a low per cent. although it tends to increase the toughness. Materials containing alumina are preferably used in amounts such that the alumina will be from .5% to 5%.

By varying the percentage of the oxids of the elements mentioned I vary the desired properties in the final product and obtain varying working conditions in the glass. The compositions described produce a transparent heat resisting glass which is exceedingly valuable for utensils and baking dishes. The glass formed by the composition however may be colored by a coloring material which will not affect the properties as described above, so that if it is desired to produce an opal glass, or an opaque glass or a glass having varying degrees of translucency to opacity, a process containing my invention may be followed.

In order to produce a glass having varying degrees of translucency I use a material that will, upon heating the glass, produce a finely divided precipitate throughout the body of the glass, and control the heat so as to vary the amount precipitated and thus control the degree of translucency to produce an opaque glass or varying degrees of translucency in the glass. Moreover the materials used by me are of such a character that upon raising the glass to near its melting point and controlling the temperature, the color may be varied in substantially the same manner that it may be varied during the formation of the glass.

To produce a translucent or an opaque glass I use materials containing oxids of the fourth periodic group which will form a precipitate in the boro silicate when properly heat treated such as oxids of titanium, zirconium and tin. Other oxids of this group may be used such as germanium, cerium and thorium, but I find it preferable to use materials containing the first mentioned oxids for the reason that the germanium and thorium are rare, and the cerium oxid is not as efficient as the said first mentioned oxids.

The oxids of the fourth periodic group that will form a precipitate in the boro silicate are precipitated however under certain thermal conditions to which the glass composition may be subjected in the formation of the glass. The materials containing these oxids are, in the process of heat treating the glass composition, broken up and the oxids dissolve during the fusion of the glass composition and unite with the silica in the presence of the alkali metals oxids which aid in the fusion of the glass composition and then the oxids of the fourth group are thrown out of solution in a finely divided form in amounts that vary from a relatively minute amount of the precipitate to an amount sufficient to produce opacity according to the temperature to which the composition is subjected, and the length of time that it is maintained, that is according to the heat treatment to which the composition is subjected in the formation of the glass so that my invention provides a process whereby all degrees of translucency from transparency to opacity, inclusive, may be produced. If the glass is raised to a higher temperature in melting, a larger amount of the oxids of the fourth periodic group is thrown out of solution into the body of the glass in the form of a precipitate, or if the temperature of the glass is maintained at a high point for a longer period of time the continued reaction of the compounds formed with the oxids of the alkaline earth metals likewise causes an increase in the amount of the precipitation of the oxids of the metals of the fourth group that are incorporated in the composition. The particular coloring of the glass is thus produced by reason of the existence of the precipitate in the glass body and not by reason of the particular color of the precipitate. The precipitate exists throughout the body in substantially a uniform degree or proportion whereby a substantially uniform color and degree of translucency is produced. This color is varied according to the heat treatment of the glass during or after fusion of the glass. It is also varied according to the percentage of the materials containing the oxids of the fourth group that are incorporated in the composition of glass forming materials. The varying degree of translucency from transparency to opacity may also be obtained after the ware has been formed by varied heat treatment of the ware in annealing the glass during which the glass ware is raised gradually to a high temperature and subsequently gradually cooled. Substantially the same rules of controlling the color are followed in the annealing process that are followed in the heat treatment process of the glass during the formation of the glass. However different effects may obtain during the annealing process of the glass for, by rapidly raising the temperature, the precipitate may be, if desired, produced near the surface of the glassware as distinct from in the body of the glassware. Also upon proper heat treatment the precipitation may be localized in any particular portion or portions of the glassware whereby varied and beautifying effects may be produced in the ware.

In forming a translucent or an opaque glass having heat resisting properties and the other desired properties heretofore described, I incorporate in the composition of the glass forming materials, materials containing precipitable oxids of the fourth periodic group in amounts that vary from .1% to 10%, and of course, correspondingly varying the percentage of the other ingredients of the glass which are described above in the formation of the transparent heat resistant glass to make up the total of 100%. Any one or more of the oxids of the fourth periodic group that will precipitate in the boro silicate of which the glass body is formed may be used.

In order to produce required degrees of translucency the amount of the oxid or oxids of the fourth periodic group is varied according to the heat treatment to which the glass is to be subjected as for example, if the glass is to be subjected to a high temperature or if a lower temperature is to be maintained a longer period of time a smaller amount of the said oxid or oxids are used. Or if the glass when finally formed is to be treated locally for decorative purposes more of the said oxids are used so that the increased coloring at local points may be formed in the glass.

I claim:—

1. A glass comprising more than 60% of silica, one or more oxids of the second periodic group having a thermal expansion of less than 4 as compared to silica, and not more than about 6% of alkali metal oxids of the first periodic group.

2. A glass comprising silica and more than 7% of one or more of the oxids of the second periodic group having a thermal expansion of less than 4 as compared to silica and not more than about 6% of alkali metal oxids of the first periodic group.

3. A glass comprising silica, one or more oxids of the second periodic group having a thermal expansion of less than 4 as compared to silica and the oxid of sodium and other oxids of the alkali metals of the first periodic group, the total of the oxids of the first periodic group not exceeding more than about 6%.

4. A glass comprising silica, one or more oxids of the second periodic group having a thermal expansion of less than 4 as compared to silica and oxids of sodium, potassium and one or more other alkali metal oxids of the first group.

5. A glass comprising silica, one or more oxids of the second periodic group having a thermal expansion of less than 4 as compared to silica and oxids of sodium, potassium, rubidium and one or more other oxids of the alkali metals of the first periodic group.

6. A glass comprising silica, one or more oxids of the second periodic group having a thermal expansion of less than 4 as compared to silica and oxids of sodium, potassium, rubidium and lithium.

7. A glass containing from 60% to 90% of silica, one or more oxids of the second periodic group having a thermal expansion of less than 4 as compared to silica, 3% to 15%, one or more alkali metal oxids of the first periodic group from .05% to 6%.

8. A glass containing more than 60% of silica, more than 3% of one or more oxids of the second periodic group having a thermal expansion of less than 4 as compared to silica and less than 6% of the oxids of the alkali metals of the first periodic group.

9. A glass containing more than 60% of silica, more than 3% of one or more oxids of the second periodic group having a thermal expansion of less than 4 as compared to silica and less than 6% of oxid of sodium and other oxids of the first periodic group.

10. The process of forming glass, which consists in forming a mixture of materials containing silica and one or more oxids of the second periodic group having an expansion of less than 4 as compared to silica and oxids of sodium and potassium and other alkali oxids of the first periodic group, and heating the glass to the fusion temperature controlled by the proportion of the last two named oxids and maintaining the said temperature until all of the glass is fused.

11. A non-transparent boro-silicate glass containing silica and a material precipitable in the boro-silicate while the boro-silicate is subjected to a high temperature.

12. A non-transparent glass comprising boro-silicate and one or more oxids of the fourth periodic group precipitable in the boro-silicate at high temperatures.

13. A non-transparent glass comprising boro-silicate, one or more oxids of the second periodic group having a thermal expansion less than 4 as compared to silica and one or more oxids of the fourth periodic group precipitable in the boro-silicate at high temperatures.

14. A non-transparent glass comprising boro-silicate, one or more oxids of the second periodic group having an expansion less than 4 as compared to silica, and one or more oxids of the first periodic group, and one or more oxids of the fourth periodic group precipitable in the boro-silicate at high temperatures.

15. A non-transparent glass comprising boro-silicate, more than 7% of one or more of the oxids of the second periodic group having a thermal expansion of less than 4 as compared to silica, and one or more oxids of the fourth periodic group precipitable in the boro-silicate at high temperatures.

16. A non-transparent glass comprising boro-silicate, one or more oxids of the second periodic group having an expansion of less than 4 as compared to silica, oxids of sodium and potassium and other oxids of the first periodic group and one or more oxids of the fourth periodic group precipitable in the boro-silicate at high temperatures.

17. The process of producing a translucent or opaque glass which consists in mixing materials containing silica and a material precipitable at high temperatures in the silicate formed by the silica raising the temperature of the mixture to produce fusion of the materials and form the silicate and to subsequently produce the precipitation in the silicate.

18. A process of forming a translucent glass, which consists in mixing materials containing silica and one or more oxids of the second periodic group with materials containing elements or compounds precipitable in the silicates at high temperatures, heating the mixture and forming the silicates of one or more of the metals of the second periodic group and combining the oxids of the metal or the metals of the fourth periodic group in the silicates and subsequently precipitating one or more of the oxids of the fourth periodic group according to the quantity of heat applied.

19. A process of forming a non-transparent glass which consists in making a mixture of materials containing silica, boric oxid, one or more oxids of the second periodic group having a thermal expansion of less than 4 as compared to silica and one or more oxids of the fourth periodic group precipitable in the boro-silicate at high temperatures, heating the mixture to form the silicates of boron and of the metal or metals of the second periodic group and combining one or more of the oxids of the metals of the fourth periodic group with the silicates and subsequently precipitating one or more of the oxids of the fourth periodic group in amounts according to the quantity of heat applied.

20. The process of forming a non-transparent glass, which consists in forming a mixture of materials containing silica, oxid of boron, one or more oxids of the second periodic group having a thermal expansion less than 4 as compared to silica, oxids of sodium and potassium and one or more of the oxids of the first periodic group and one or more oxids of the fourth periodic group precipitable in boro-silicate at high temperatures melting the mixture to produce fusion of the composition and form silicates of boron and of one or more of the metals of the second periodic group and combining one or more of the oxids of the metals of the fourth periodic group with the said silicates and subsequently heating the ware sufficient to precipitate one or more oxids of the metals of the fourth periodic group, the amount precipitated varying according to the temperature to which the ware is raised, and the time the temperature is maintained.

21. The process of forming a non-transparent glass, which consists in forming the glass of silica and other oxids together with materials precipitable at high temperatures in silicates forming the ware and subsequently heating the ware sufficiently to precipitate additional amounts of the said material within the ware.

22. The process of forming a non-transparent glass, which consists in forming a mixture of silica and one or more other oxids of materials precipitable in the silicates and in amounts according to the desired degree of translucency to be formed and according to the temperature to which the mixture is to be subjected in fusion and subsequent to fusion up to the time of drawing glass, heating the mixture to produce fusion of the materials of the mixture and maintaining the temperature during the said time.

23. The process of decorating ware which consists in forming the ware of silica, oxid of boron and one or more other oxids of materials precipitable in the boro-silicates, and heating the ware sufficiently to precipitate the said materials in the ware, the amount precipitated varying according to the amount of heat applied.

24. The process of forming a non-transparent glass which consists in making a mixture of materials containing silica, oxid of boron, and one or more other oxids of materials precipitable in the boro silicate, heating the mixture to cause fusion of the materials, and modifying and maintaining the temperature to precipitate the precipitable materials according to the degree of translucency desired, the amount precipitated varying according to the amount of heat applied.

In testimony whereof I have hereunto signed my name to this specification.

ELBERT E. FISHER.